United States Patent

Furomoto et al.

[11] Patent Number: 5,967,438
[45] Date of Patent: Oct. 19, 1999

[54] SPINNING REEL HAVING BALANCING MEANS

[75] Inventors: Yoshiyuki Furomoto, Osaka; Hideo Noda, Sakai; Noboru Sakaguchi, Tondabayashi; Osamu Yoshikawa, Sakai, all of Japan

[73] Assignee: Shimano, Inc., Japan

[ * ] Notice: This patent is subject to a terminal disclaimer.

[21] Appl. No.: 08/355,191

[22] Filed: Dec. 8, 1994

Related U.S. Application Data

[63] Continuation of application No. 07/881,790, May 12, 1992, Pat. No. 5,379,957.

[30] Foreign Application Priority Data

| May 14, 1991 | [JP] | Japan | 3-33214 |
| Jul. 25, 1991 | [JP] | Japan | 3-184988 |
| Jul. 25, 1991 | [JP] | Japan | 3-184989 |
| Nov. 14, 1991 | [JP] | Japan | 3-298634 |

[51] Int. Cl.$^6$ ............................................... A01K 89/01
[52] U.S. Cl. .............................................................. 242/231
[58] Field of Search ................................. 242/230, 231, 242/232, 233

[56] References Cited

U.S. PATENT DOCUMENTS

| 2,713,463 | 9/1955 | Sarah . | |
| 2,966,314 | 12/1960 | Mombur . | |
| 3,743,207 | 7/1973 | McMickle . | |
| 3,788,570 | 1/1974 | Yamazaki et al. . | |
| 3,797,774 | 3/1974 | Dumbauld . | |
| 4,005,832 | 2/1977 | Yamazaki . | |
| 4,095,756 | 6/1978 | Morishita . | |
| 4,147,313 | 4/1979 | Sazaki . | |
| 4,162,048 | 7/1979 | Sazaki | 242/232 |
| 4,202,508 | 5/1980 | Ishida et al. . | |
| 4,279,387 | 7/1981 | Morimoto | 242/232 |
| 4,389,027 | 6/1983 | Sazaki et al. | 242/233 |
| 4,702,432 | 10/1987 | Kaneko et al. . | |
| 4,705,228 | 11/1987 | Maruyama et al. | 242/233 |
| 4,848,695 | 7/1989 | Kaneko | 242/232 |
| 4,874,144 | 10/1989 | Murakami . | |
| 4,923,140 | 5/1990 | Yamaguchi et al. | 242/230 |
| 5,096,137 | 3/1992 | Carlsson et al. | 242/233 |
| 5,149,007 | 9/1992 | Saito | 242/246 |
| 5,246,186 | 9/1993 | Sugawara | 242/232 |
| 5,289,990 | 3/1994 | Kawabe | 242/233 |
| 5,295,640 | 3/1994 | Kawabe | 242/248 |
| 5,316,239 | 5/1994 | Sugawara | 242/241 |
| 5,318,247 | 6/1994 | Sugawara | 242/319 |
| 5,350,129 | 9/1994 | Furomoto et al. | 242/231 |
| 5,356,091 | 10/1994 | Sugawara | 242/319 |

FOREIGN PATENT DOCUMENTS

| 1113782 | 4/1956 | France . |
| 66347 | 6/1956 | France . |
| 1213235 | 3/1960 | France . |
| 1217679 | 5/1960 | France . |
| 1261980 | 4/1961 | France . |
| 1506359 | 12/1967 | France . |
| 2195397 | 3/1974 | France . |

(List continued on next page.)

OTHER PUBLICATIONS

J.P Den Hartog, *Mechanical Vibrations*, pp. 292–312 (McGraw–Hill Book Company, Inc. New York, NY 1947).
International Standart 1940/1, pp. 1–13 (Switzerland 1986).
International Standard 8821, pp. 1–12 (Switzerland 1989).

*Primary Examiner*—Katherine A. Matecki
*Attorney, Agent, or Firm*—Jeffer, Mangels, Butler & Marmaro LLP

[57] ABSTRACT

A spinning reel has a reel body and a rotor attached attached to the reel body and rotatable about a longitudinal axis for retrieving a fishing line. The spinning reel has also a balancer attached to the rotor for restricting an imbalance amount of rotation of the rotor substantially within 200 g-mm.

20 Claims, 17 Drawing Sheets

FOREIGN PATENT DOCUMENTS

| | | |
|---|---|---|
| 2393530 | 1/1979 | France . |
| 2615358 | 11/1988 | France . |
| 36-11285 | 5/1961 | Japan . |
| 39-16088 | 8/1964 | Japan . |
| 51-126295 | 10/1976 | Japan . |
| 52-55892 | 4/1977 | Japan . |
| 52-80887 | 6/1977 | Japan . |
| 53-33033 | 8/1978 | Japan . |
| 724787 | 2/1988 | Japan . |
| 758572 | 3/1989 | Japan . |
| 1-105464 | 7/1989 | Japan . |
| 3-216133 | 9/1991 | Japan . |
| 4-30860 | 3/1992 | Japan . |
| 58-121565 | 8/1993 | Japan . |
| 882777 | 11/1961 | United Kingdom . |

SPINNING REEL HAVING BALANCING MEANS

This application is a continuation of application Ser. No. 07/881,790, filed May 12, 1992, now U.S. Pat. No. 5,379,957.

BACKGROUND OF THE INVENTION

1. Field of the Invention

The present invention relates to a spinning reel having a balancing means for restricting rotational imbalance of a rotor.

2. Description of the Related Art

There is known a spinning reel having a balancer weight attached to a rotor as the above-mentioned balancing means (e.g. Japanese laid-open utility model gazette No. 52-80887).

However, with the above-described balancer weight, it is difficult to achieve complete solution to the rotational imbalance. On the other hand, it has been practically impossible to modify a configuration of the rotor or an arrangement of components thereof for the sole purpose of improvement in the balance.

With this type of balancer, the farther the balancer is disposed relative to the rotational axis, the greater a value of the moment becomes. Therefore, in often times, a balancer of a relatively small weight will suffice for the purpose. However, in the case of the conventional construction where the balancer is attached to a cylindrical portion of the rotor, since this cylindrical portion is usually arranged at an inner side of a skirt portion of the rotor, the balancer can not project outwards at this portion, so that the balancer necessarily tends to be large in weight.

Then, in order to arrange the balancer without being interfered with by the skirt portion of the spool, it is conceivable to arrange the balancer at a rear end portion (on the side of the spool body) of the rotor. However, since this portion usually is not formed with high manufacturing precision, there arises a new problem that the arrangement of the balancer at this position may adversely affect the physical strength of this portion.

Moreover, in disposing the balancer at the rear end portion of the rotor, if the balancer is attached here in such a manner as to project significantly from an outer periphery of the rotor, this balancer may come into contact with e.g. an angler's finger in the course of rotation of the rotor.

SUMMARY OF THE INVENTION

Accordingly, a primary object of the present invention is to provide an improved spinning reel of the above type which allows a user of the reel to restrict rotational vibration of the rotor within a permissible range thus allowing smooth line-retrieving operation by well balancing the rotor rotation without sacrificing other functions of the spinning reel.

For accomplishing the above-noted object, according to the characterizing features of the present invention, a spinning reel comprises:

a reel body;

a rotor attached to the reel body and rotatable about a longitudinal axis for retrieving a fishing line; and a balancing means attached to the rotor for restricting an imbalance amount of rotation of the rotor substantially within 200 g -mm.

Functions and effects of the above features will be described next.

By using a commercially available rotational balance testing machine, the present inventor has conducted intensive experiments with a plurality of spinning reels having rotor diameters ranging approximately between 40 mm and 100 mm. Then, it has been found out that a rotational imbalance amount not exceeding approximately 200 g -mm is sufficient to restrict vibration resulting from the imbalance to such a degree as not to provide discomfort to the user while complete elimination of rotational vibration is yet to be achieved with said amount.

Therefore, the construction of the present invention can achieve practically sufficient performance with the advantage of facility in designing of the rotor in comparison with the conventional construction which involves a great amount of works in designing often with the aid of a computer to determine the appropriate disposing position and the weight of the balancing means.

That is, as described above, through the experiments, the present inventor has come to realize that a rotational imbalance amount not exceeding approximately 200 g -mm is sufficient to restrict vibration resulting from the imbalance to such a degree as not to provide discomfort to the user while complete elimination of rotational vibration is yet to be achieved with said amount.

Then, the inventor proceeded to obtain an amount of deviation in the center of gravity as a value derived by dividing the rotational imbalance amount by a mass of the rotor. Then, it was found that this deviation amount is maintained substantially lower than 3.5 mm in the above-described situation.

Therefore, by restricting the gravity-center deviation amount substantially within 3.5 mm, it is possible to determine a reference value which is independent of the size of the rotor, whereby a more precise rotor balance control becomes possible.

According to a further embodiment of the invention, a spinning reel comprises:

a reel body;

a rotor attached to the reel body to rotate for retrieving a fishing line, the rotor including a base end portion supported to the rotor to be rotatable about a longitudinal axis and a pair of arm portions extending from the base end portion along the longitudinal axis;

a bail extending between the arm portions;

the rotor and the bail together constituting a rotary unit having two reference positions spaced apart from each other with a predetermined distance therebetween along the longitudinal axis; and a balancing means attached to the rotor for restricting an imbalance amount of rotation of the rotor substantially within 200 g -mm at each of the two reference positions.

The above features can achieve the distinguished functions and effects to be described next.

Based on the results of the afore-described experiments, by restricting the imbalance amount of rotation lower than approximately 200 g -mm at each reference position, it becomes possible to reduce a centrifugal force at the rotor face rotating about the longitudinal axis at the respective reference positions thereby to achieve a static balance and also to restrict generation of torque about an axis normal to the longitudinal axis thereby to achieve a dynamic balance.

In short, through the simple arrangement for restricting the rotational imbalance amount within 200 g-mm, in the case also of a rotor having the base end portion and the arm portions disposed side by side along the longitudinal axis, it has become possible to achieve not only the static balance but also the dynamic balance through the restriction of the torque generation, such that the spinning reel having these features can provide a smooth line retrieving operation without giving the user uncomfortable feel.

Further, and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of the present invention; in which.

DESCRIPTION OF THE PREFERRED EMBODIMENTS

Preferred embodiments of a spinning reel relating to the present invention will now be described in details with reference to the accompanying drawings.

Figure 4:
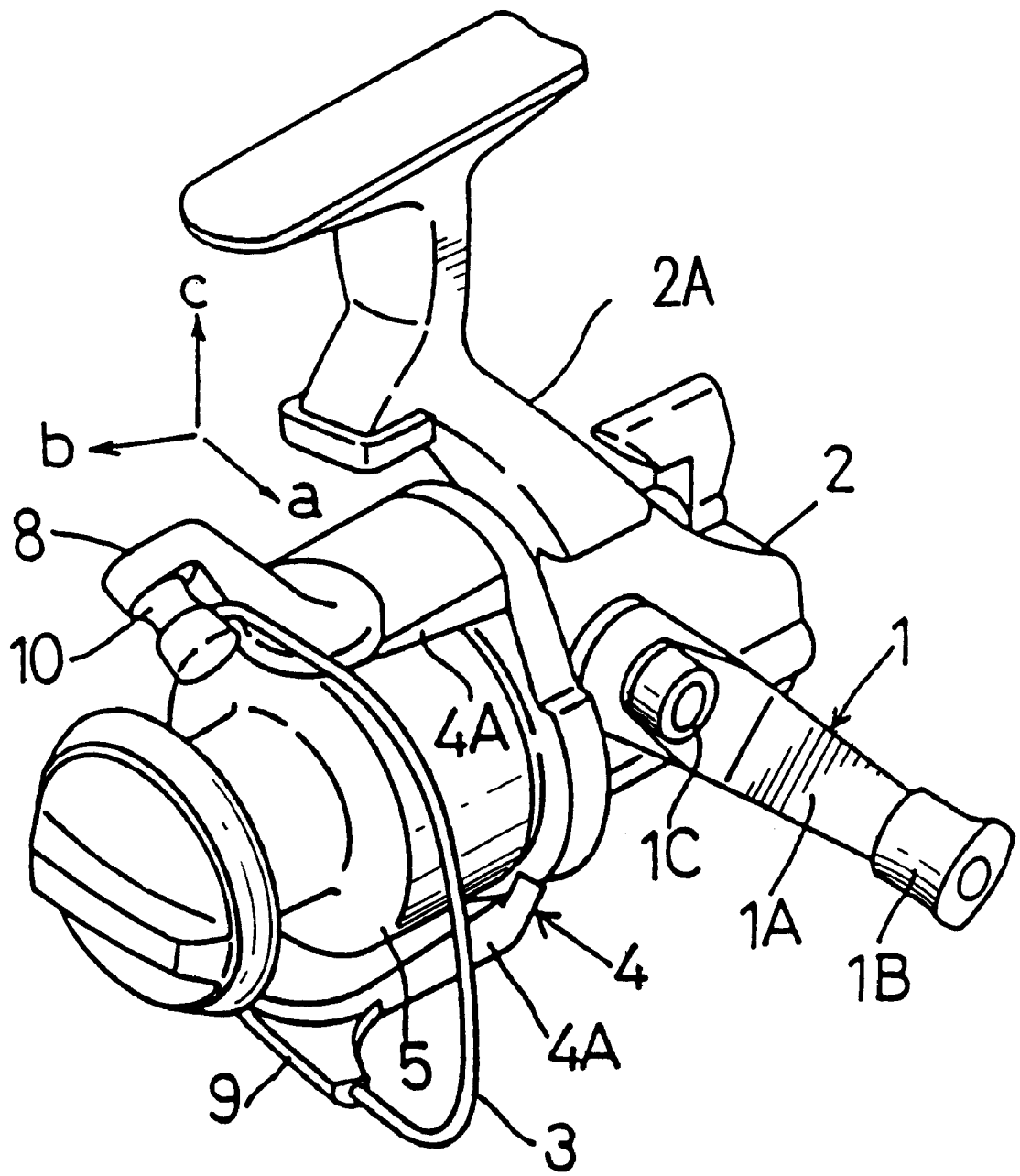
FIG. 4 is a perspective view of an entire spinning reel.
Figure 7:
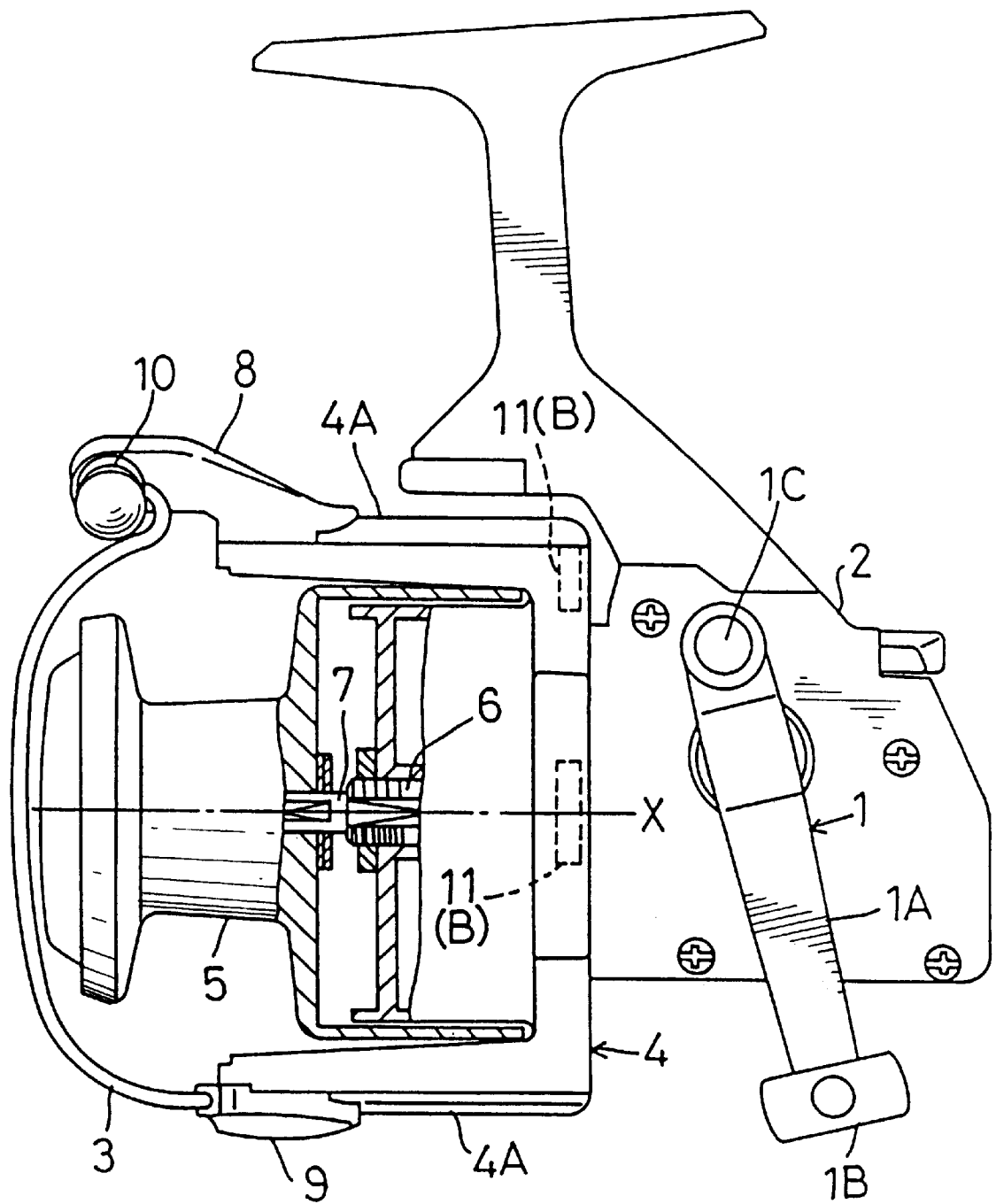
FIG. 7 is an overall side view with some parts being cut away.

A spinning reel relating to a first embodiment is shown in FIGS. 4 and 7. As shown, the spinning reel includes a reel body 2 having a handle 1. At forward positions of the reel body 2, there are disposed a rotor 4 having a bail 3 and a spool 5 for retrieving an unillustrated fishing line. At other forward positions of the reel body 2, there are also disposed a cylindrical shaft 6 for transmitting a force from the handle 1 to the rotor 4 and a spool shaft 7 which supports a spool 5.

The rotor 4 includes a cylindrical base end portion and a pair of arm portions 4A, 4A extending from the base end portion along a longitudinal axis X. The arm portions 4A, 4A are so disposed as oppose to each other across the longitudinal axis X. One arm portion 4A carries an arm cam 8 and the other arm portion 4A carries a pivotable arm 9; and the bail 3 is provided between the arm cam 8 and the pivotable arm 9. This bail 3 is switchable between a line releasing position and a line retrieving position.

The arm cam 8 includes a line roller 10 acting as a line guide unit for guiding the fishing line. Further, in this spinning reel, there are provided balancing means B, B at two positions along the longitudinal axis for the purpose of offsetting weight imbalance resulting from the weights of such components as the arm portions 4A, 4A, the bail 3, the arm cam 8, the pivotable arm 9 and the line roller 10.

Particularly, as illustrated in FIGS. 1, 2, 3 and 4, in this reel, there are assumed rotary flat faces S, T which act as reference positions along the longitudinal axis at forward and rear positions with respect to the rotor 4. Then, a moment value is obtained by multiplying the weights of the components including the arm portions 4A, 4A, the bail 3, the arm cam 8, the pivotable arm 9 and the line roller 10 and an arm length extending in a radial direction from the longitudinal axis X where the weights of the components are present. Then, this moment value is divided between lengths corresponding to distances from the position of the gravity to the respective rotary flat faces S, T. That is to say, the moment is divided in such a manner that the moment divided between the rotary flat faces S, T will not produce a torque. In this way, the moment values divided between the flat faces S, T are composed within the rotary flat faces. This composite moment is considered as an imbalance rotation amount between the two rotational flat faces S, T. Then, by disposing the balancing means B at appropriate positions, these balancing means B produce a counter moment for offsetting the composite moment.

Figure 1:
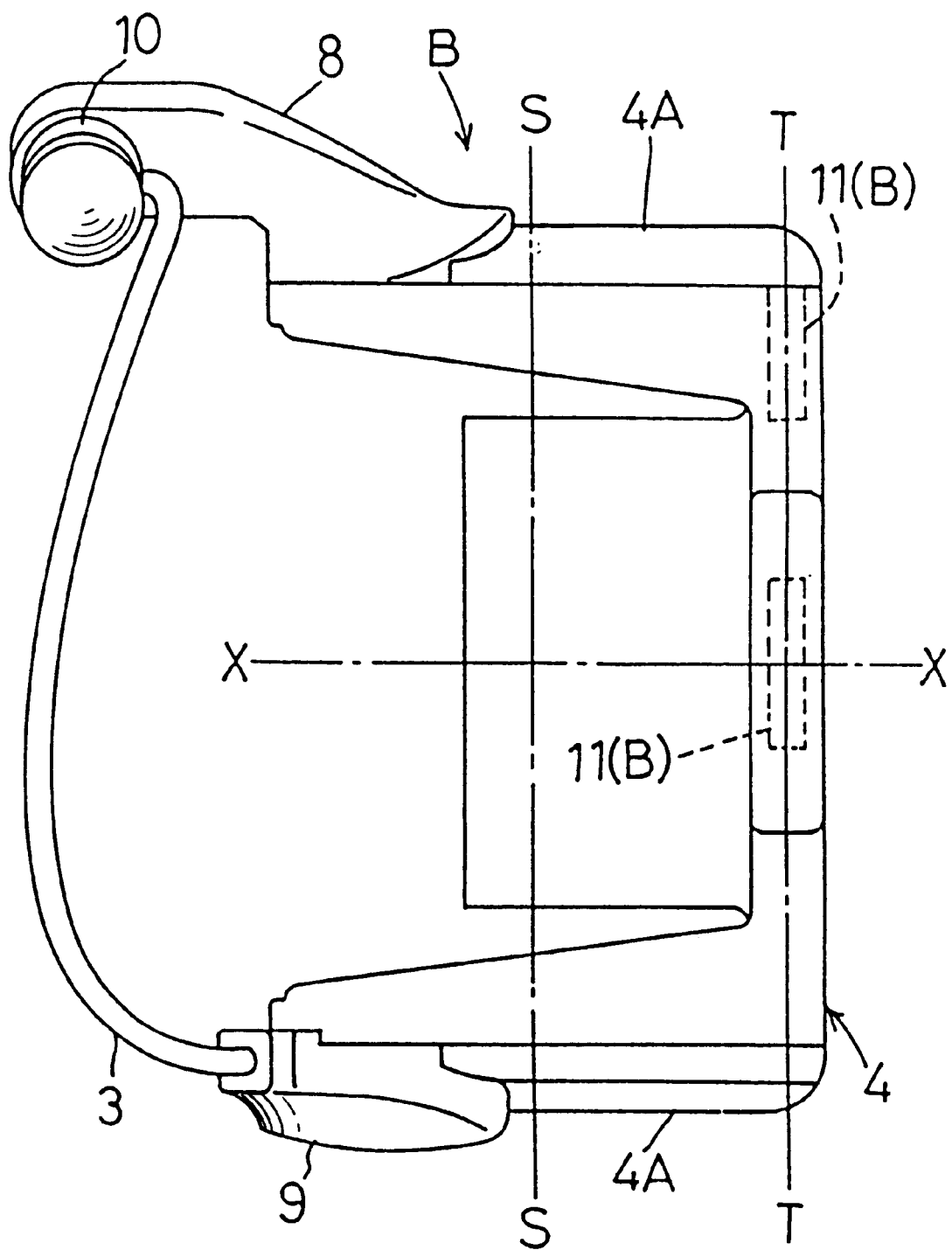
FIG. 1 is a side view of a rotor.
Figure 2:
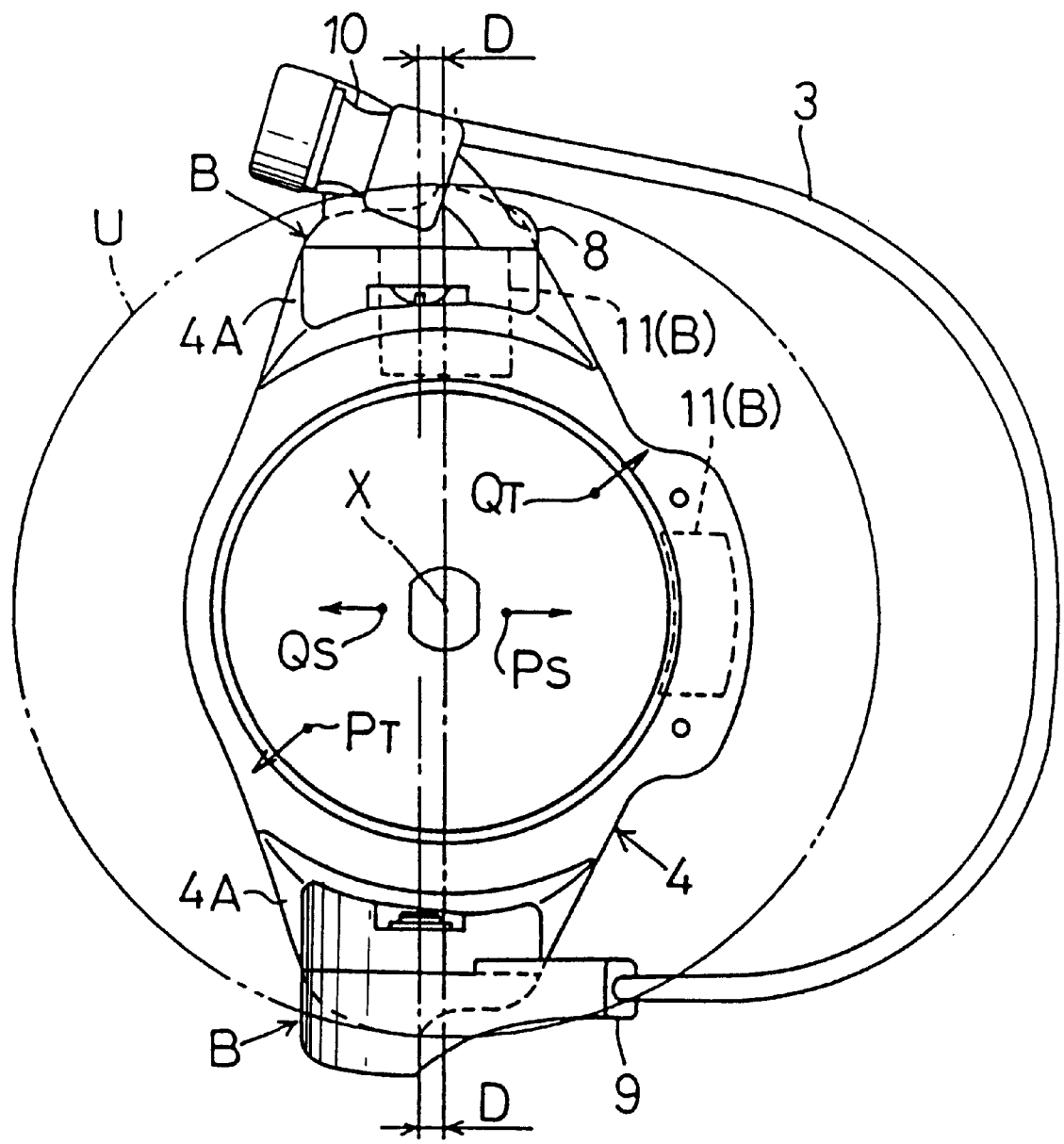
FIG. 2 is a front view of the rotor.
Figure 3:
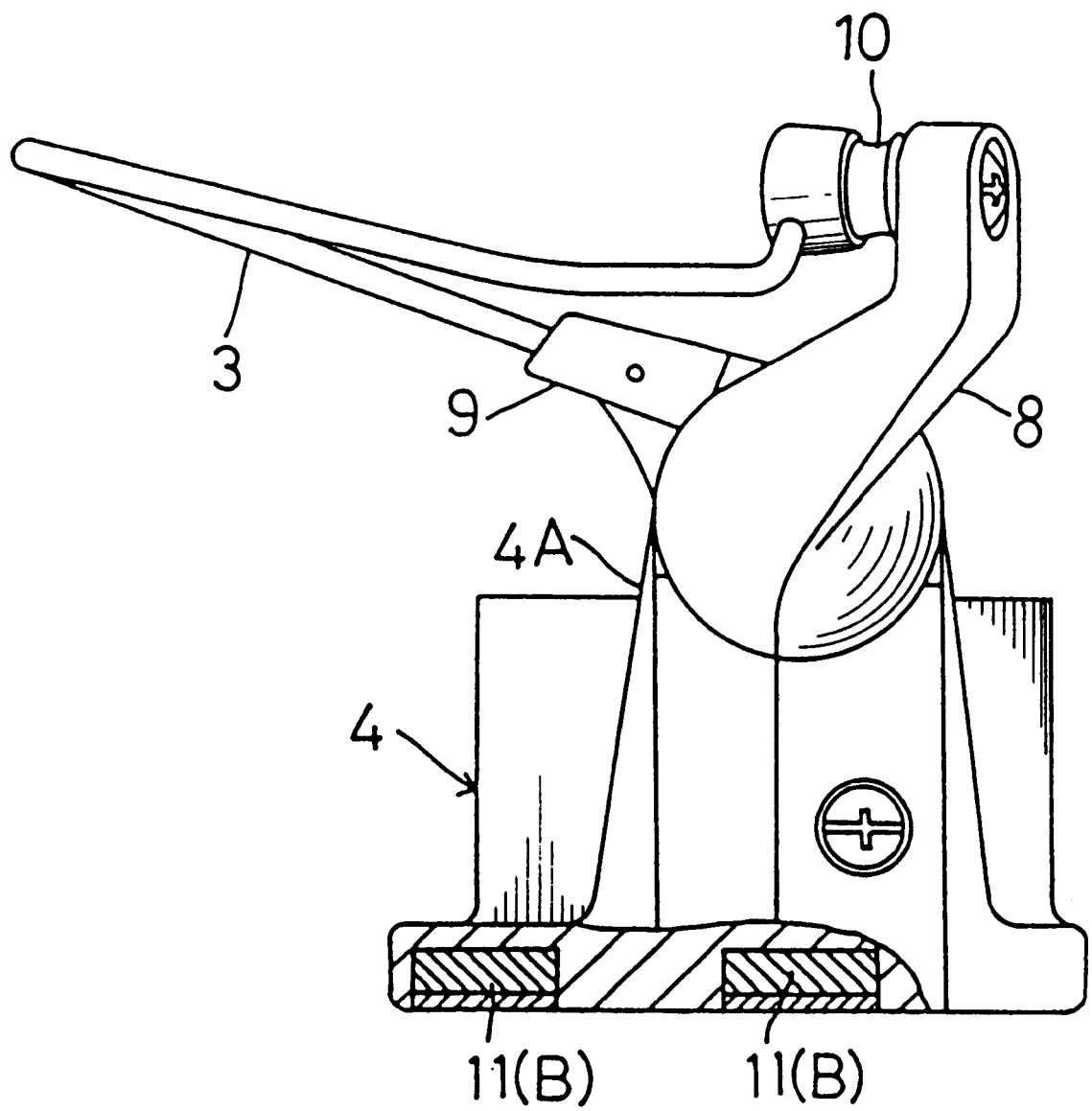
FIG. 3 is a plane view of the rotor.

Then, as illustrated in FIG. 2, the pair of arm portions 4A, 4A are displaced by a predetermined amount D relative to the longitudinal axis X thereby to form the one balancing means B and also, as illustrated in FIG. 3, two balancers 11, 11 are disposed at the base end portion to form the other balancing means B.

That is to say, a point PS subjected to the above-described composite moment is displaced towards the bail 3 relative to the longitudinal rotational axis X. Therefore, the displacement amount D of the pair of arm portions 4A, 4A is so set as to locate a center of gravity QS of the balancing means B at a position opposed to the position of the point PS across the axis X.

The balancers 11, 11 are disposed outwardly of an outer periphery of the rotor 4 and also inwardly of a rotational path U of an outer peripheral portion of the arm portion 4A, as viewed from the direction of the longitudinal rotational axis X. This can prevent contact between e.g. a user's finger and the balancers 11 during a line retrieving operation. That is, the arrangement not only reduces the weights of the balancers 11, 11 but also prevents the contact between the finger and the balancers without requiring any special elements for these purposes.

Incidentally, on this rotational flat face the point PT subjected to the composite moment appears as shown in FIG. 2. So, that the balancers 11, 11 are so disposed as to cause a composite gravity center QT of these two balancers 11, 11 to appear at the position opposed to the point PT across the rotational axis X.

As a result, when a fishing line retrieving operation is effected by rotating the handle of this reel, this line retrieving operation can be effected in a smooth manner because of the rotational balance is maintained at the forward and rear positions of the rotor 4. During a line casting operation also, it is possible to restrict rotational irregularity due to imbalance of the rotor 4.

Further, since the balancer 11 is disposed at the rear end side of the rotor 4, as compared with the conventional reel construction of this type, it is possible to dispose the balancer 11 farther away from the axis X. Thus, the weight reduction of the balancer 11 does not result in deterioration in the strength of the rotor 4.

If the balancing means B is so arranged as to restrict the rotational imbalance amount at the rotational flat faces S, T within 200 g -mm, then, it becomes possible to achieve not only a static balance but also a dynamic balance of the rotor 4. Consequently, the line retrieving operation using the handle can be effected smoothly. Further, during the casting operation too, rotational vibration due to imbalance of the rotor 4 can be effectively restricted.

Figure 5:
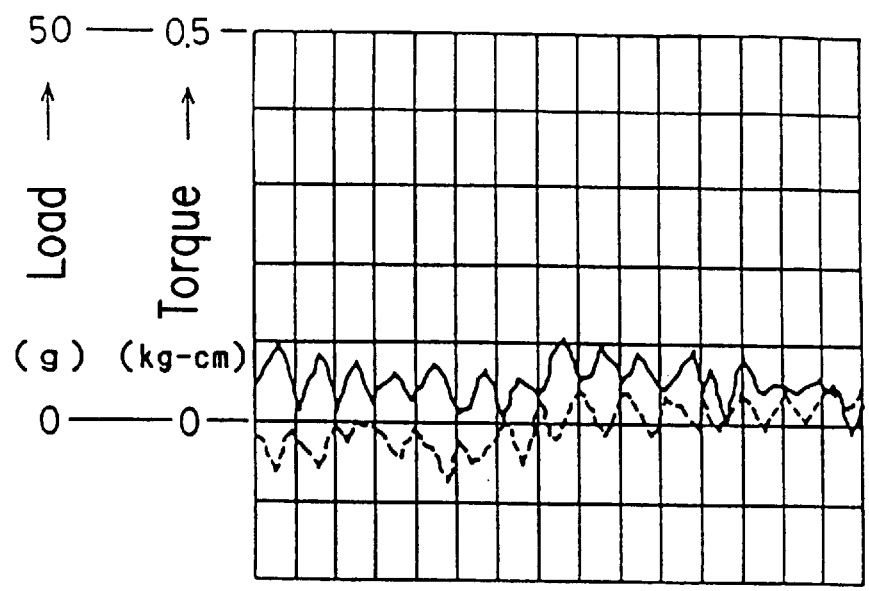
FIG. 5 is a graph showing load-torque characteristics after a balance adjustment.
Figure 6:
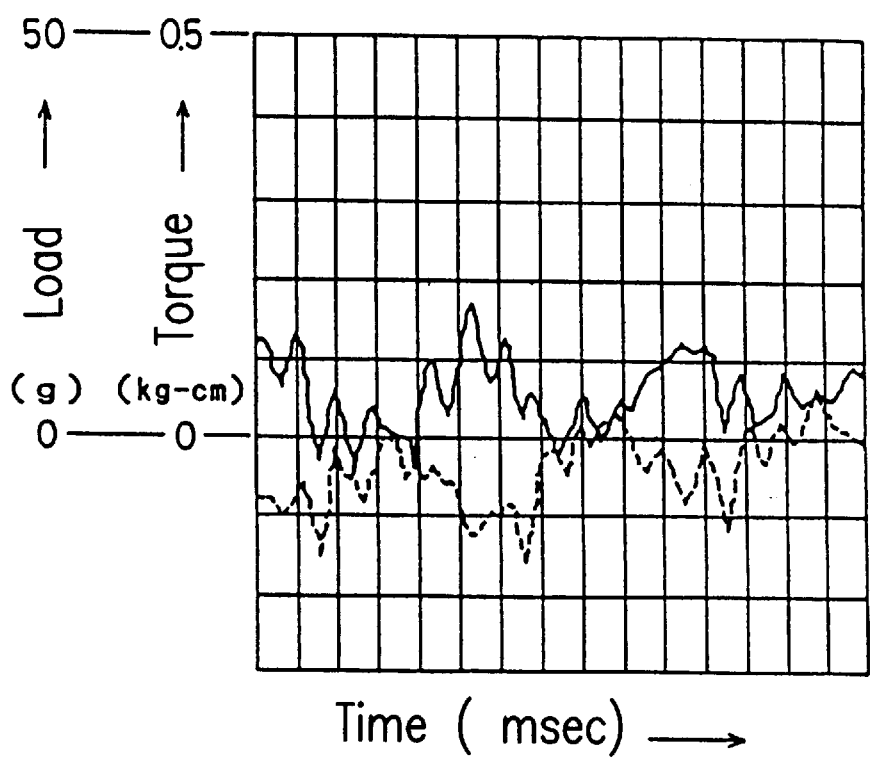
FIG. 6 is a graph showing load-torque characteristics before the balance adjustment.

Experiments were conducted by comparing vibration characteristics of a spinning reel having the imbalance amount at the reference positions set at 6 g -mm (a deviation amount of gravity center not exceeding 1 mm) and the same spinning reel having the imbalance amount exceeding 200 g -mm before the balancing adjustment. The results are shown in FIGS. 4 through 6. More particularly, as illustrated in FIG. 4, a sensor is set to sense vibration at a leg portion 2A of the reel to be attached to a fishing rod. Using this sensor, vibration characteristics in directions (a), (b) and (c) are obtained. The illustrated characteristics comprise those in the direction (a) where the vibration affects in the right and left directions of the reel. As shown in FIGS. 5 and 6, a dot line denotes a load while a solid line denotes a torque about the direction (a). It may be seen that vartorion in the load and variation in the torque are both reduced. In the embodiment illustrated in FIG. 5, the torque about the direction (a) in FIG. 4 in the direction transverse to the axis of rotation varies from about 0 to about 0.1 kg-cm, and the horizontal load in the same direction varies from about −5 g to about +5 g. In the vibration characteristics in the other directions (b), (c) too, the load and torque variations are reduced. These are not illustrated.

Incidentally, in order to further restrict rotation of the rotor 4 during a line casting operation, as shown in FIGS. 4 and 7, in this spinning reel, a further balancer 1C is provided on the side opposed to a grip portion 1B in order to offset the weights of the arm portions 1A and the grip portion 1B of the handle 1. With this, imbalance of the handle 1 relative to the handle shaft 1 can be corrected, so that the handle 1 can be prevented from being rotated during the casting operation.

Next, further embodiments of the present invention will be specifically described.

(1) The balancer 11 can be disposed at a plurality of positions along the longitudinal axis.

(2) In case the rotor 4 has a relatively short axial length, only one reference position will suffice for the detecting of the imbalance amount.

(3) It is conceivable to standardize the reference value usable regardless of possible difference in the mass of the rotor 4. In this case, the reference value will be obtained by dividing the reference imbalance amount of 200 g -mm by the mass of the rotor 4 (generally referred to as a center of gravity deviation). In practice, it is preferred that the imbalance amount not exceed 60 g -mm and the gravity center deviation amount not excee 2 mm. Further, by considering a rotational velocity of the rotor 4 during a line retrieving operation in addition to the size of the rotor 4, it becomes possible to control the rotational imbalance amount according to the JIS standards (Japanese Industrial Standards). Specifically, the gravity center deviation amount is multiplied by the rotational velocity to produce a value. Then, by maintaining this value within a range between 16 and 40 mm/s, it is possible to cause the rotational performance of the rotor 4 to substantially comply with the 6th grade of the JIS.

Figure 8:
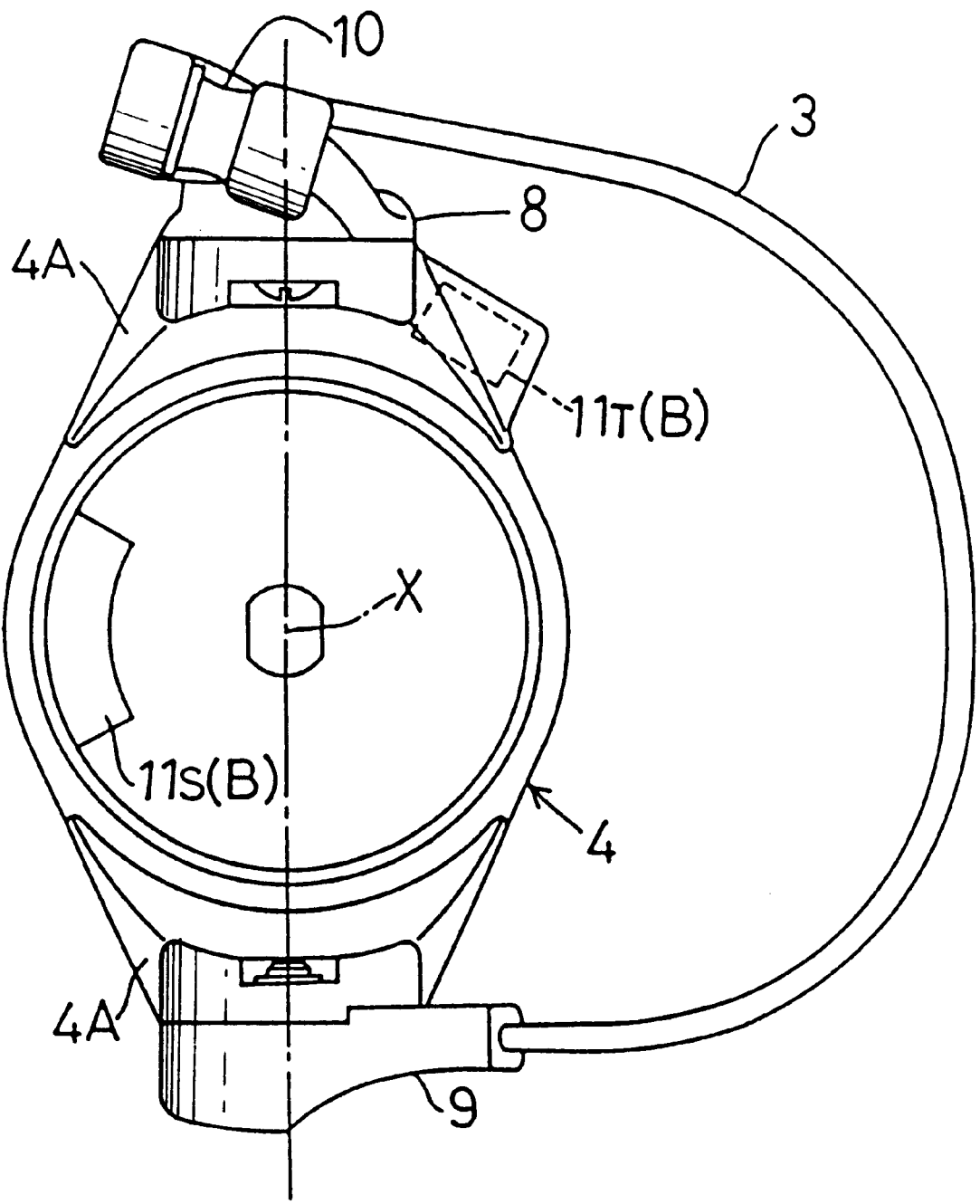
FIG. 8 is a front view illustrating a further embodiment in which a disposing arrangement of a balancer is modified.

(4) As illustrated in FIG. 8, it is conceivable to form the balancing means B by disposing the balancer 11S at a forward side of the rotational flat face S in place of the displacement of the disposing positions of the pair of arm portions 4A, 4A (i.e. the offset arrangement as shown in FIG. 2). Further, as shown in the same drawing, it is also conceivable to dispose a single balancer 11T at a rear side of a rotational flat face T.

Figure 9:
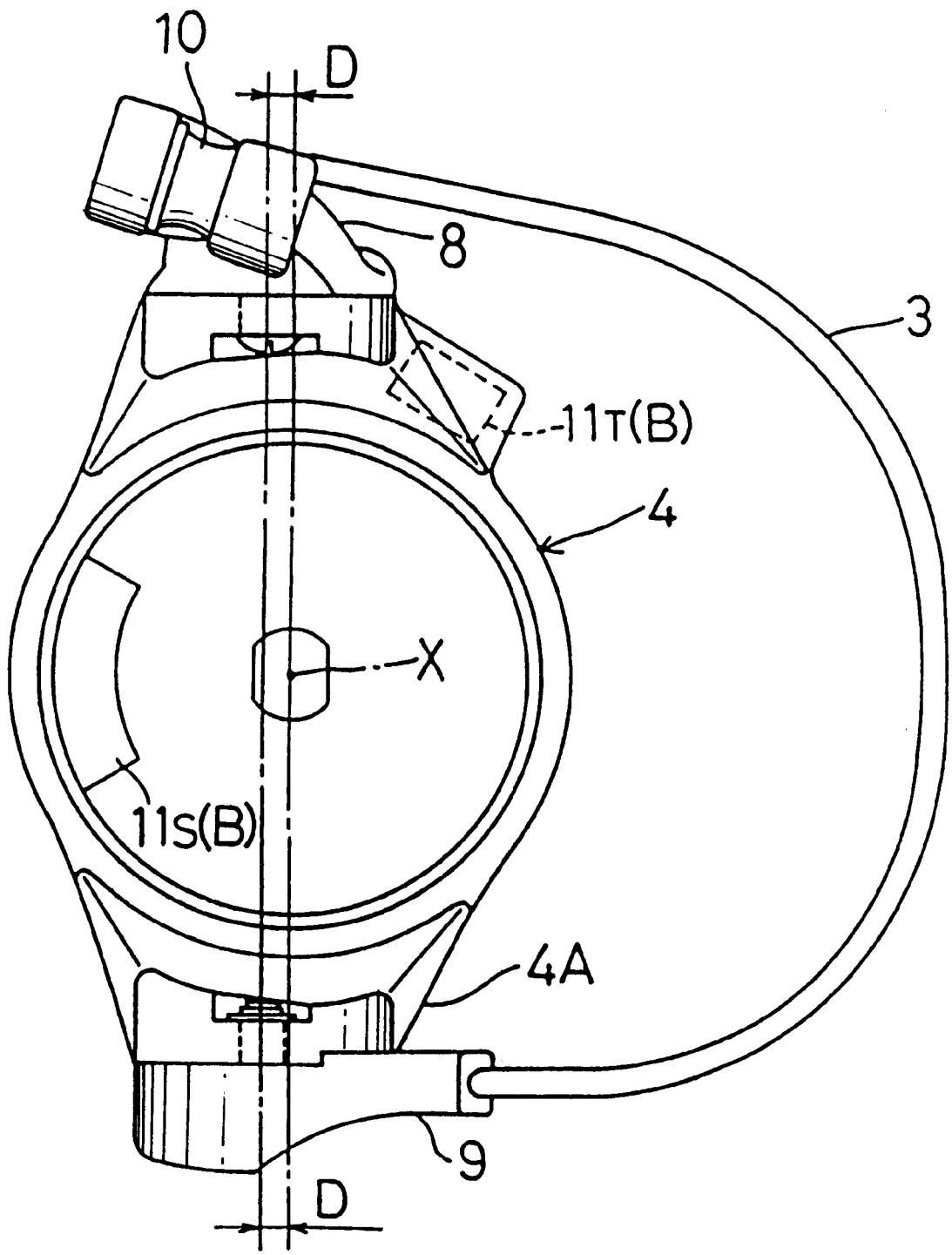
FIG. 9 is a front view showing a condition where a pair of arm portions are sideways displaced from a rotational center relative to the condition shown in FIG. 8.

(5) FIG. 9 shows a further construction of the balancing means B. In this case, relative to the condition of FIG. 8, the pair of arm portions 4A, 4A are displaced sideways by an amount D relative to the rotational center and a balancer 11S is provided on a front side rotational flat face S. Alternately, it is conceivable to provide the single balancer 11T in the rear side rotational flat face T.

Figure 10:
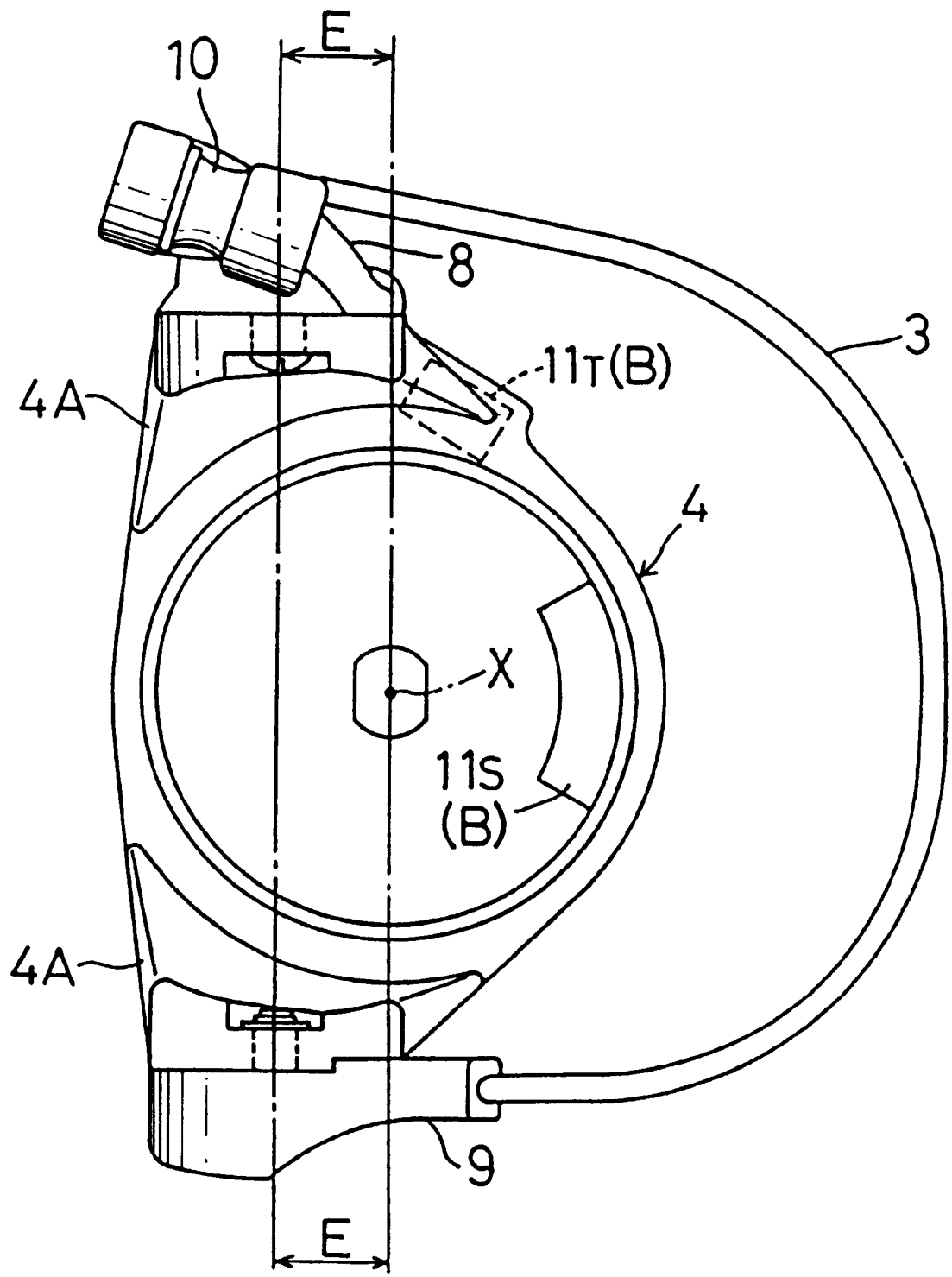
FIG. 10 is a front view showing a further condition where a balancer having a rotary face at a forward portion thereof is displaced to the opposite side across the rotational center relative to the condition of FIG. 9.

(6) FIG. 10 shows a still further construction of the balancing means B. In this case, relative to the condition of FIG. 9, the pair of arm portions 4A, 4A are further displaced sideways by a larger amount E relative to the rotational center and the balancer 11S is provided on the side opposite across the rotational center to the displaced positions of the arm portions 4A, 4A in the forward side rotational flat face S. As also shown in this FIG. 10, it is conceivable to provide the single balancer 11T in the rear side rotational flat face T.

Figure 11:
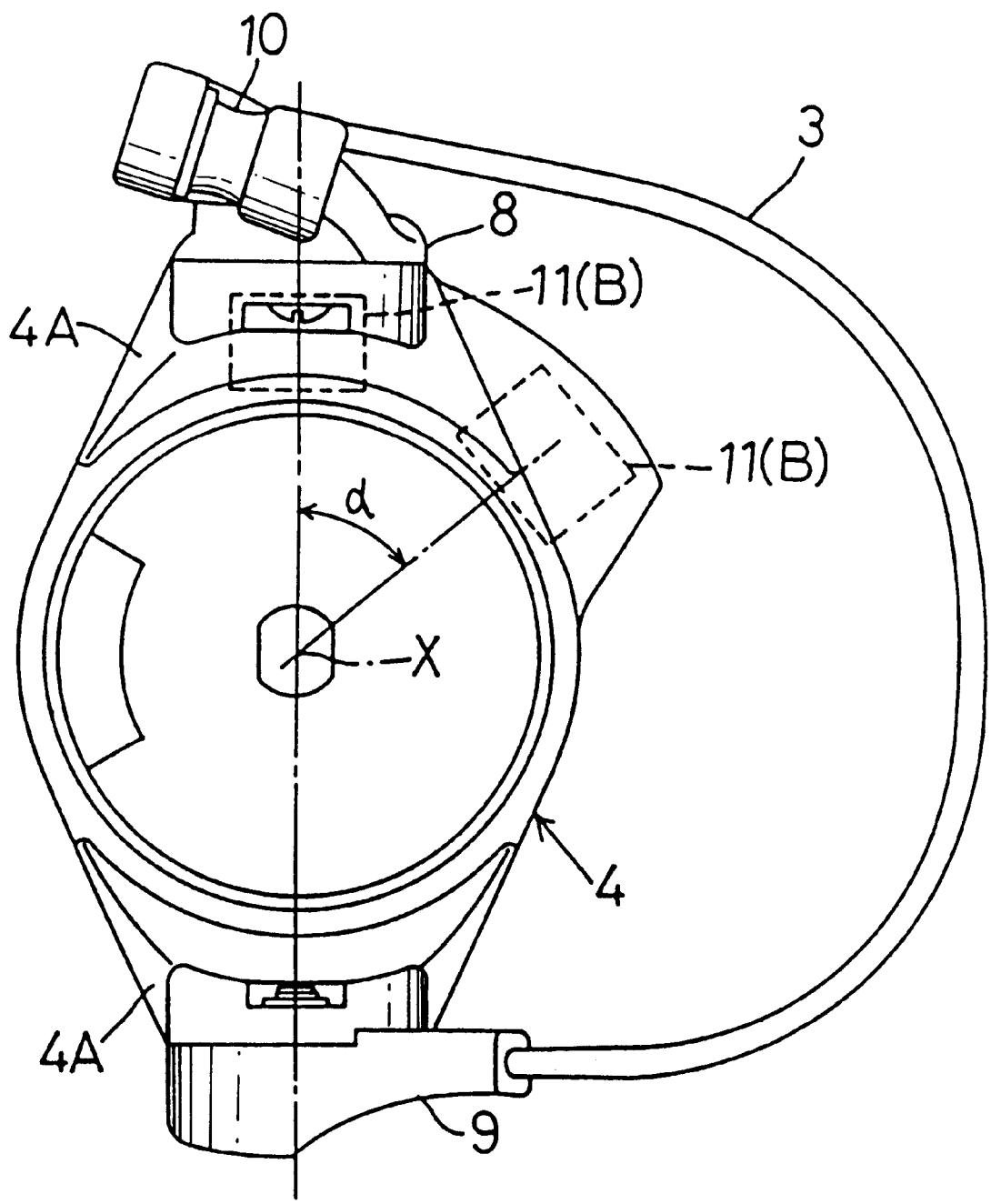
FIG. 11 is a front view a further embodiment in which a disposing arrangement of the balancer is further modified.

(7) FIG. 11 shows a further construction. In this, the balancers 11, 11 are provided respectively inside the arm portion 4A of the rotor 4 and at at peripheral portion of this rotor 4 with the balancers 11, 11 forming an angle ($\alpha$) smaller than 90 degrees in the direction along the axis X. Further, the balancer 11 disposed at the peripheral portion of the rotor 4 has a weight greater than that of the other balancer 11 disposed inside the rotor 4. This construction has the advantage of allowing reduction in the weight and the size of the balancer 11 disposed inside the rotor 4 thus facilitating arrangement of other components such as a toggle spring inside the arm portion 4A.

Figure 12:
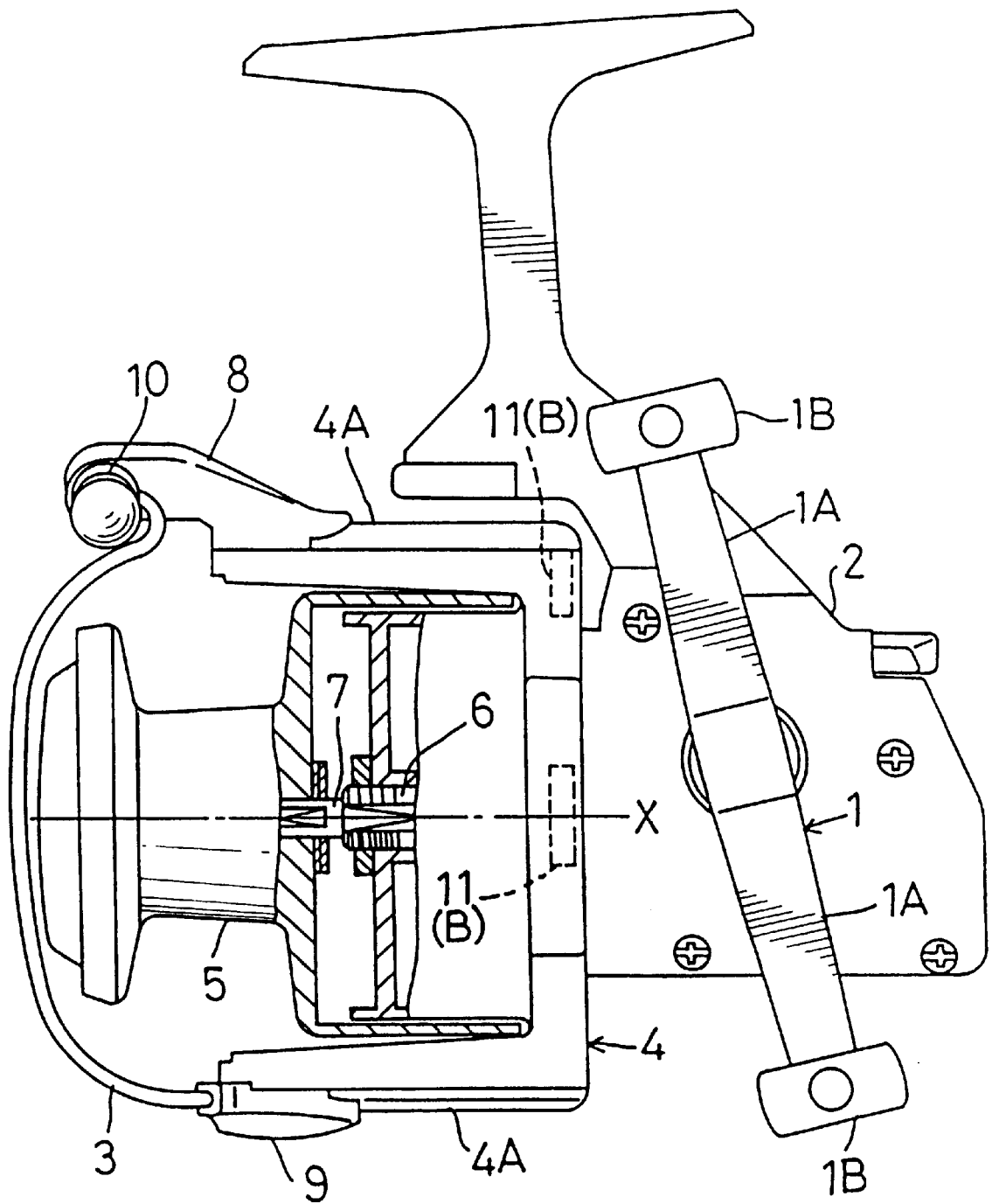
FIG. 12 is an overall side view of a spinning reel relating to the further embodiment.

The invention provides a further embodiment designed for further restriction of rotation of the rotor 4 during a casting operation. That is, as illustrated in FIG. 12, the handle 1 includes a pair of arm portions 1A, 1A having a same length and a pair of grip portions 1B, 1B having a same weight. With this, it is possible to further avoid imbalance of the handle 1 relative to the handle shaft thereby to prevent rotation of the handle 1 as well during the casting operation.

Figure 13:
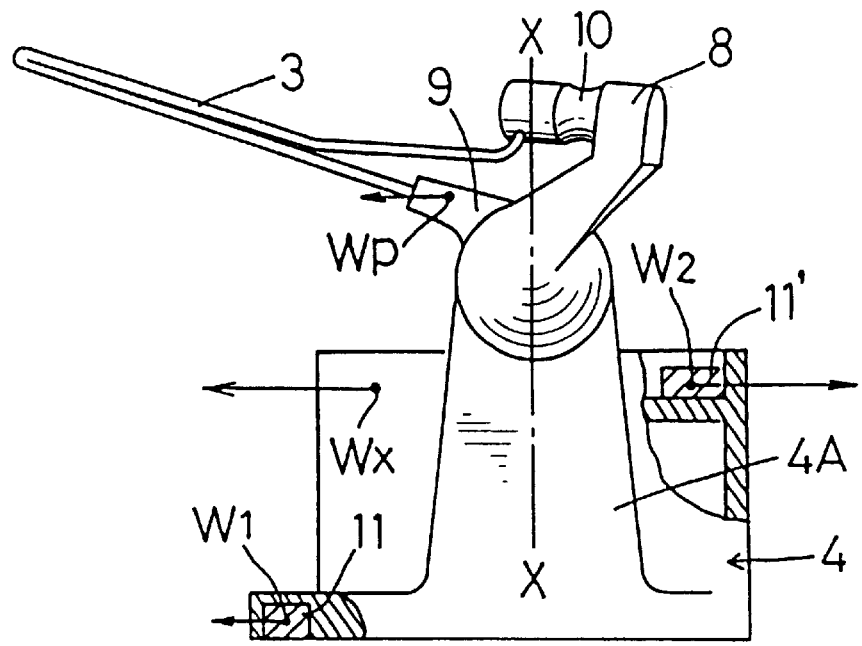
FIG. 13 is a side view showing a spinning reel relating to a still further embodiment.
Figure 14:
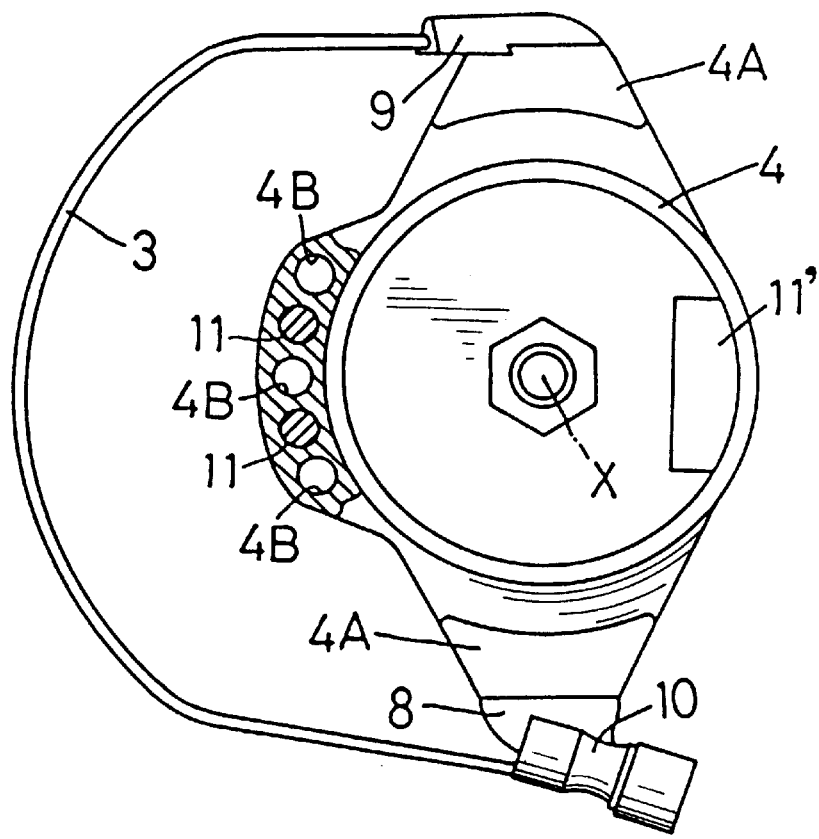
FIG. 14 is a front view showing the spinning reel of FIG. 13.

FIGS. 13 and 14 illustrate a further embodiment of the present invention. In this construction, the balancers 11, 11 are disposed adjacent the rear end portion of the rotor 4 on the same side as the gravity center WP of the rotor 4 as viewed in the direction along the rotational axis X. So that, a composite gravity center WX of the gravity center WP of the rotor 4 and the gravity center W1 of the balancers 11, 11 is formed at an intermediate position along the rotational axis X. Then, a further balancer 11' is disposed to provide a gravity center W2 at a position opposed to the the position of the composite gravity center WX for offsetting the magnitude of this composite gravity center WX. Further, as shown in the same drawings, it is also conceivable to form, on a rear face side adjacent the rear end of the rotor 4, a plurality of concave portions 4B for accommodating the balancers 11 in order to allow selective arrangement of the balancers 11 in accordance with possible irregularities present in the reel products.

Figure 15:
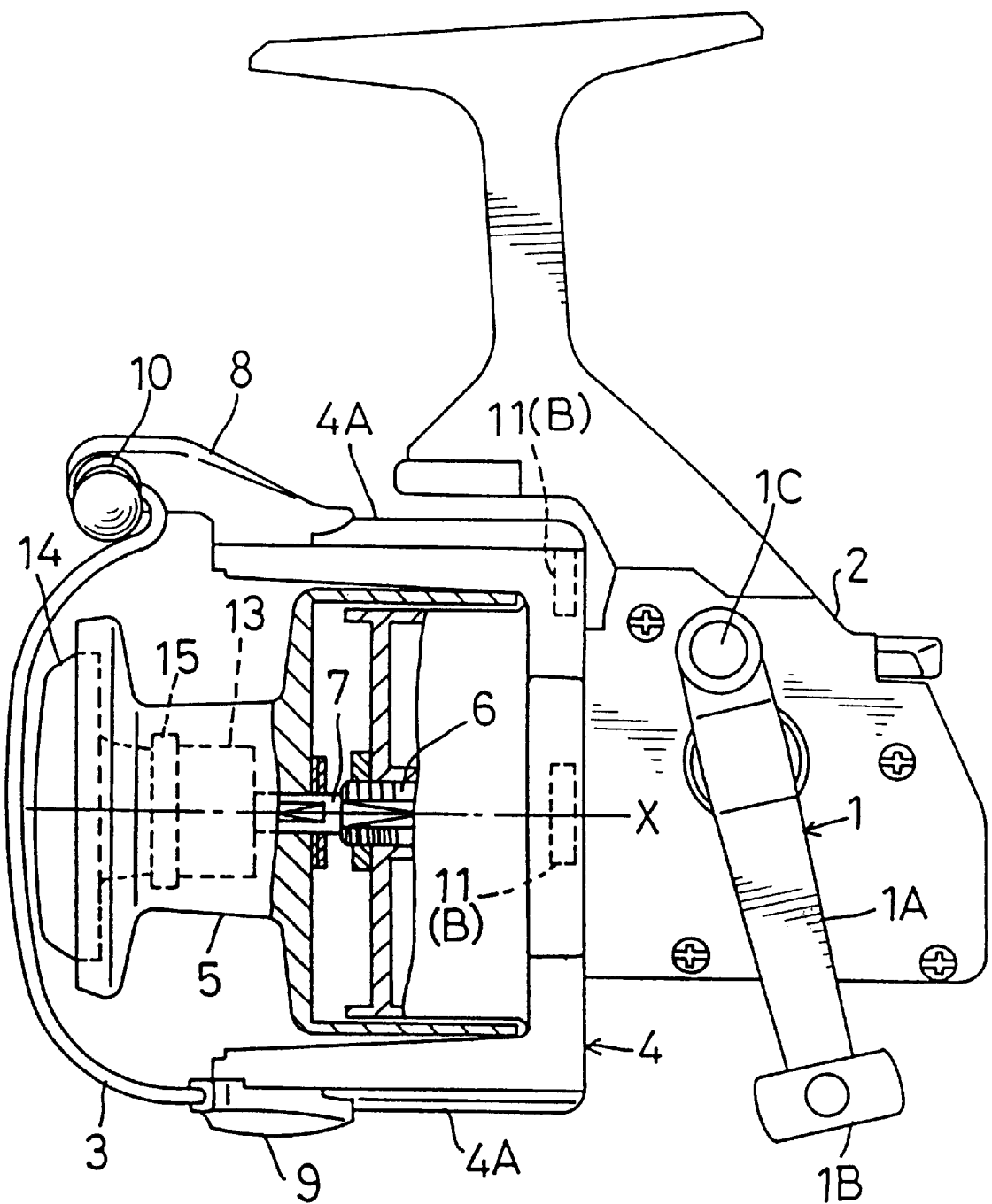
FIG. 15 is a side view showing an entire spinning reel relating to a still further embodiment.

A still further construction shown in FIG. 15 is possible for further restricting rotation of the rotor 4 during a casting operation. That is, in this reel construction, the balancer 1C is provided on the side opposed to the grip portion 1B in order to offset the weights of the arm portion 1A and the grip portion 1B of the handle 1. This construction too can solve the problem of imbalance of the handle 1 relative to the handle shaft thus preventing rotation of the handle 1 during the casting operation.

Figure 16:
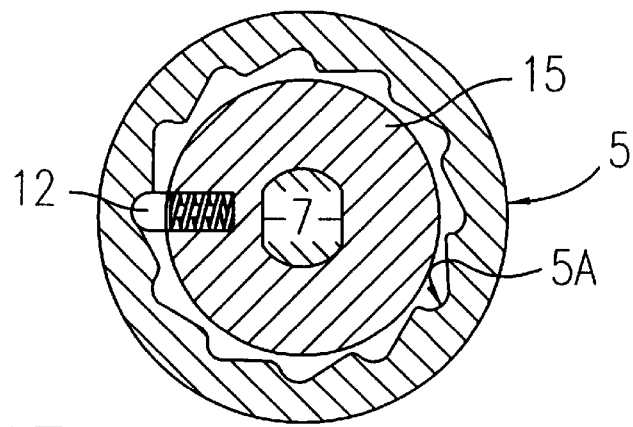
FIG. 16 is a section view showing a click mechanism incorporated in the reel of FIG. 15.

In FIG. 16, a reference numeral 12 denotes a click sound generating mechanism projectable and retractable relative to a disc 15 interposed between a friction plate 13 and a drag control element 14 of a drag mechanism. This mechanism generates a clicking sound through engagement and disengagement with and from uneven faces 5A . . . defined inside the spool 5 when there occurs a sliding movement inside the drag mechanism.

A further embodiment of the present invention will be described next.

A construction of a spinning reel of this further embodiment is as follows. A line roller is provided at a pivotable arm attached to the arm portion of the rotor. At one end of this line roller, there is supported a bail. Further, by using as a reference the pivotable arm having the line roller, a first balancer is provided at a position closer to the reel body than to the pivotable arm. And, at a position opposed, across the axis, to a composite gravity center composed of the gravity center of the components disposed on the side of the pivotable arm and the gravity center of the first balancer and at an arm portion opposed to the pivotable arm, there is provided a second balancer having a weight for offsetting the composite gravity center.

Figure 17:
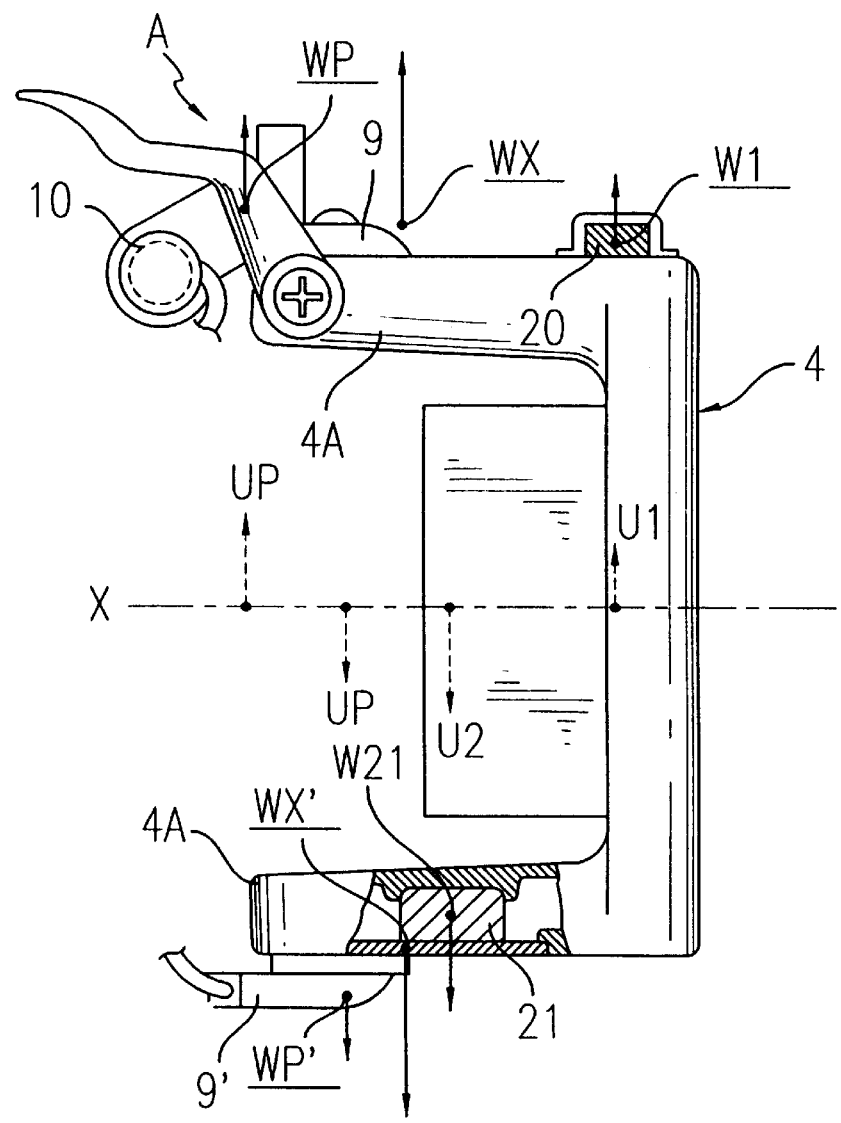
FIG. 17 is a side view showing an arrangement of a balancer for a reel relating to a still further embodiment.
Figure 18:
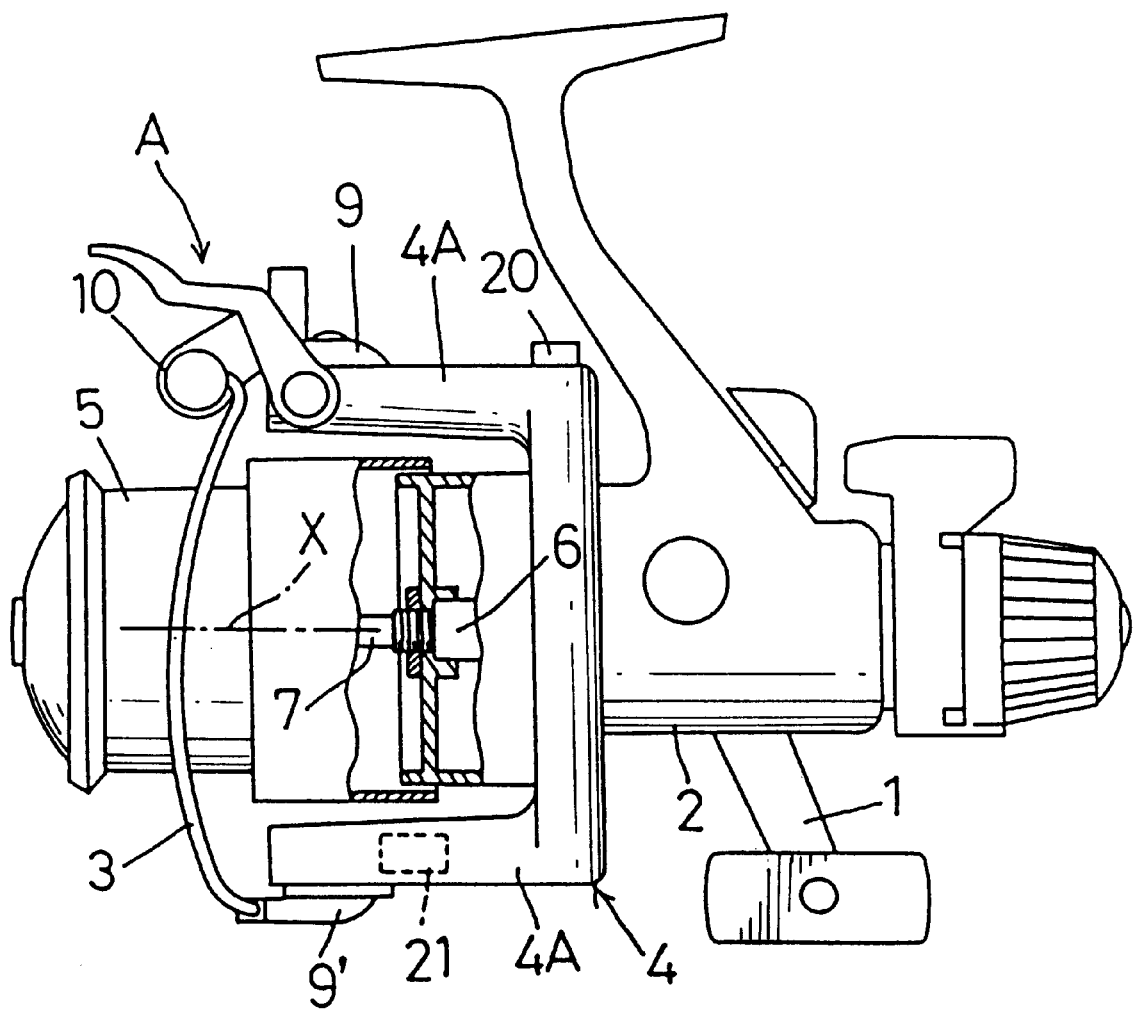
FIG. 18 is a side view showing the entire reel of FIG. 17.
Figure 19:
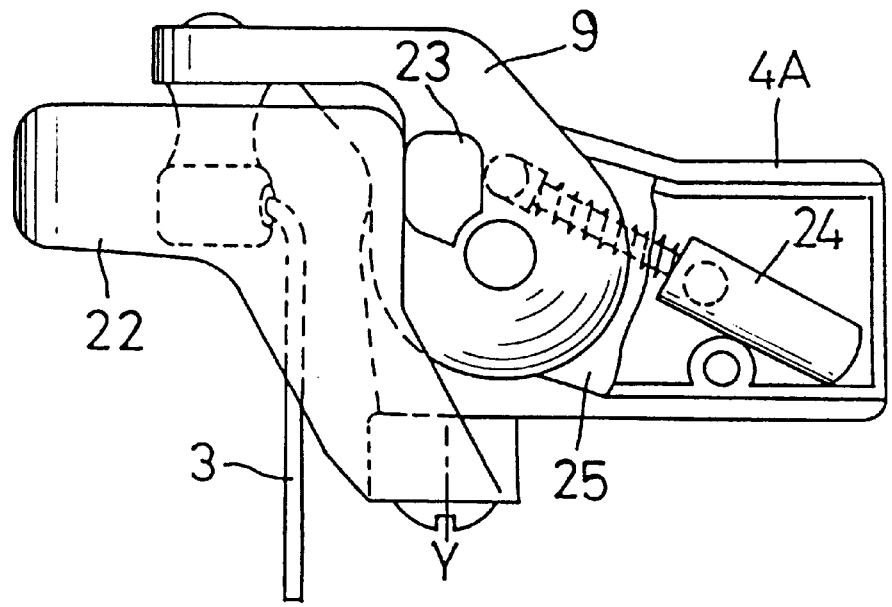
FIG. 19 is a plane view showing a control mechanism incorporated in the reel of FIG. 17.
Figure 20:
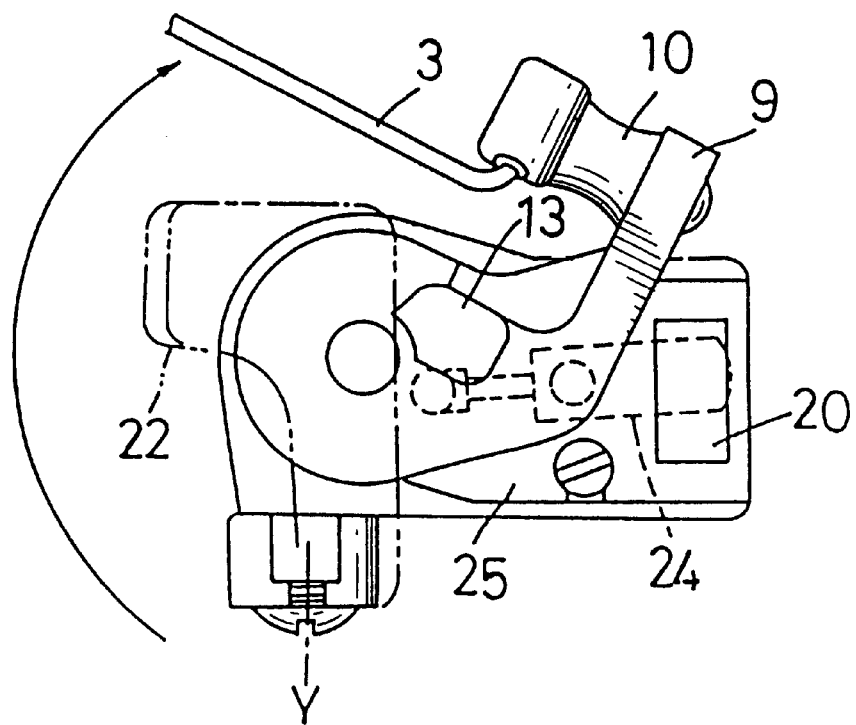
FIG. 20 is a plane view illustrating the control mechanism of the reel of FIG. 17 under a line releasing condition.

With the above-described construction, as illustrated in FIG. 17, the first balancer 20 is disposed on the same side as the gravity center WP of the components including the pivotable arm with respect to the axis X, such that the composite gravity center WX composed of the gravity center WP and the gravity center W1 of the first balancer 20 appears at a position between the two gravity centers. Then, the second balancer 21 having the appropriate weight is provided for offsetting the composite gravity center WX by setting a composite gravity center WX' composed of a gravity center WP' of the pivotable arm 9' on this side and of its gravity center W2 on a rotational path of the above-described composite gravity center WX. Accordingly, the weights are balanced in the direction along the rotational axis X. Moreover, since the respective composite gravity centers WX, WX' are positioned on the same rotational path, there occurs no torque or the like during the rotation of the rotor 4.

FIG. 17 illustrates moment values of the above balanced condition relative to the axis X. As shown, a moment value U1 resulting from the weight of the first balancer 20, a moment value U2 resulting from the weight of the second balancer 21 and a further moment value UP' resulting from the weight of the pivotable arm 9' are balanced with one another.

That is to say, by disposing the first balancer on the heavier side instead of providing a single balancer, the composite gravity center WX is displaced towards the reel body 2. Consequently, even if the second balancer 21 is provided to the rotor 4, this second balancer 21 can be arranged at such position as to offset the weight of this composite gravity center WX.

The rotor 4 includes the pair of arm portions 4A, 4A at positions opposed to each other across the axis X. Further, for the pivotable arms 9, 9' attached to the respective arm portions 4A, 4A, there is attached the bail 3 which is switchable between a line releasing position and a line retrieving position.

Further, one of the pivotable arms 9, 9' includes the line roller 10 for guiding the fishing line and a control mechanism A for switching the bail 3 to the releasing position by one step operation. Then, in this reel, there is provided the balancing means for offsetting imbalance in the weights of the components including the line roller 10, the control mechanism A.

Specifically, by using as a reference the gravity center WP of the weights of the components 10, A, etc., the first balancer 20 is provided at the arm portion 4A of the rotor 4 on the side of the reel body 2. Further, with respect to the composite gravity center WX composed of the gravity center WP of the components and the gravity center W1 of the first balancer 20, at an opposite position across the axis X and at the arm portion 4A opposed to the pivotable arm 9, there is provided the second balancer 21 having an appropriate weight at a position on the rotational path of the composite gravity WX composed of the gravity center WP' of the pivotable arm 9' on this side and of its gravity center W2 in order to offset said composite gravity center WX during rotation of the rotor 4.

Through the above-described arrangements of the respective balancers 20, 21, the weights are balanced with each other in the direction along the axis X. Further, since the second balancer 21 is disposed at the position for offsetting the weight of the gravity center WX, even when a mechanical looseness is developed at the support construction for the rotor 4, there occurs no vibration during the rotation of the rotor 3, whereby a smooth line retrieving action is possible.

Incidentally, the control mechanism A includes a lever 22 pivotably attached to the arm portion 4a of the rotor 4 to be pivotable about an axis Y and a cam element 23 operable to switch the pivotable arm 9 through contact with the lever 22 when this lever 22 is operated upwards.

Inside the arm portion 4A of this side, there is incorporated a toggle spring 24 for urgedly maintaining the pivotable arm 9 at either the line releasing position or the line retrieving position. And, this spring 24 is covered with a cover member 25.

A still further embodiment of the present invention will be described next.

According to a reel of this embodiment, the line roller is provided to the pivotable arm attached to the arm portion of the rotor, with one end of the bail being supported to this line roller. Further, the first balancer is provided to the rotor on the side where the bail at its line retrieving position is located in the direction along the axis that is, on a first half of the rotor. Also, relative to a first composite gravity center composed of the gravity center of the components formed on the pair of arm portions and that of the first balancer, the second balancer is provided at a position opposed to the composite gravity center across the axis, i.e., on a second half of the rotor. Placement of the second balancer results in a second composite center of gravity which offsets the first composite gravity center.

Figure 21:
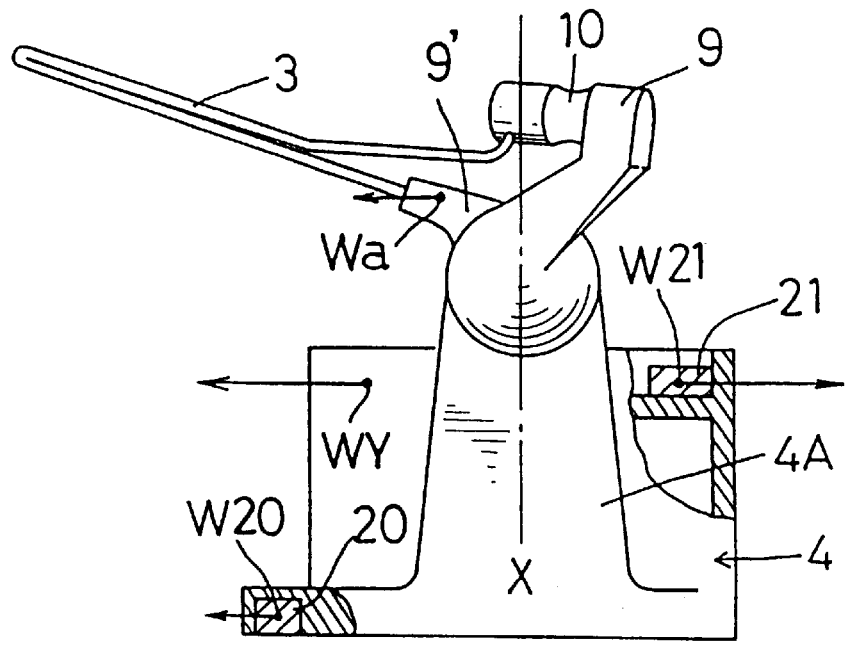
FIG. 21 is a side view showing an arrangement of a balancer for a reel relating to a still further embodiment.
Figure 22:
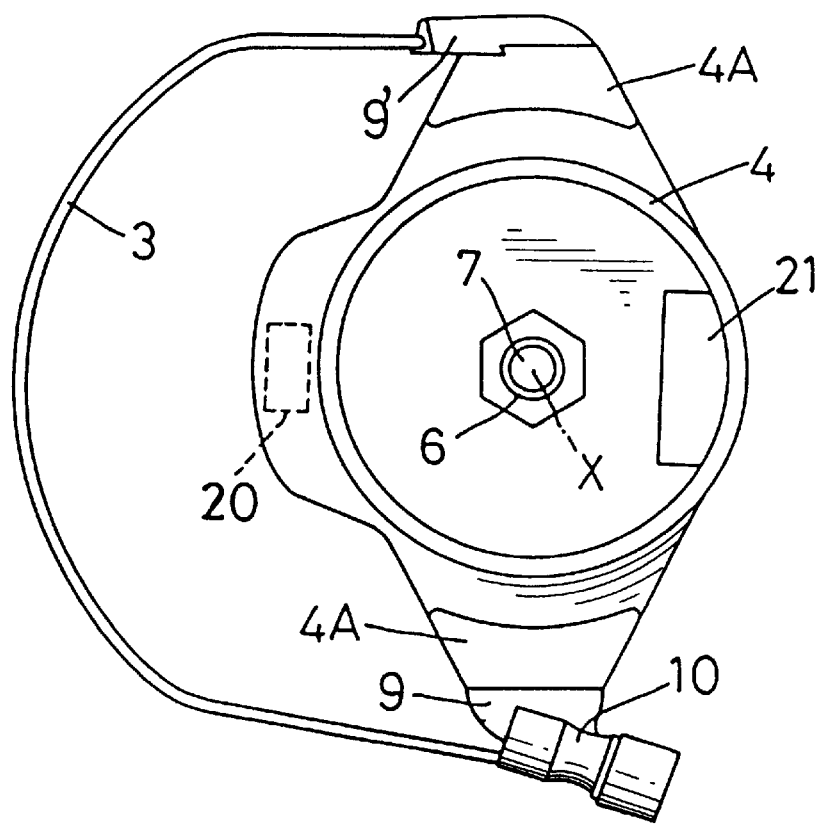
FIG. 22 is a front view showing an arrangement of the balancer of the reel of FIG. 21.

With the above-described construction, as illustrated in FIGS. 21 and 22, the first balancer 20 is arranged on the same side as the bail 3 with respect to the axis X. So that, although the gravity center WP of the components attached to the bail 3 and the pair or arm portions 4A, 4A is positioned at a relatively forward portion of the reel, the first composite gravity center WX composed of said gravity center WP and of the gravity center W1 of the first balancer 20 is shifted towards the reel body, whereby the weights are balanced with each other in the direction along the axis. Moreover, since the second balancer 21 is arranged on the rotational path of the first composite gravity center WX, that is, since the first and second composite gravity centers define rotational paths which coincide there occurs no torque during the rotation of the rotor 4.

That is to say, in the case of the above construction too, by arranging the first balancer 20 on the heavier side in place of providing a single balancer, the first composite gravity center WX is displaced towards the reel body 2. Consequently, even when the second balancer 21 is to be attached to the rotor 4, this second balancer 21 can be disposed at a position offsetting the first composite gravity WX.

Accordingly, through the unique arrangements of the balancers, the spinning reel of the present invention can provide a smooth line retrieving action without causing uncomfortable vibration e.g. on the fishing rod even if a high-speed line retrieving action is effected after a mechanical looseness is developed in the reel through its use for an extended period of time.

In this embodiment, as shown in FIGS. 21 and 22, there is provided in the difference in the arrangement of the balancer at the portion of the rotor 4.

That is, the first balancer 20 is disposed at a position of the rotor 4, where the bail 3 at its line retrieving position is located in the direction along the axis X, displaced relative to the reel body 2. Further, with respect to the first composite gravity center WX composed of the gravity center WP of the weights of the components such as the bail 3, the pivotable arm 9, the line roller 10 and so on and of the gravity center W1 of the first balancer 20, at a position opposed to the first composite gravity center WX across the axis X, there is provided the second balancer 21 having the weight capable of offsetting said first composite gravity center WX during the rotation of the rotor 4.

Through the above-described arrangements of the respective balancers 20, 21, the weights in the direction along the axis are balanced with each other. Further, since the second balancer 21 is located at the position capable of offsetting the weight of the first composite gravity center WX, the reel can provide a smooth line retrieving operation without causing vibration during the rotor rotation even after a mechanical looseness has developed in the support construction for the rotor 4.

In addition to the above-described various embodiments, further modified constructions are conceivable. For instance, it is conceivable to embed the balancers in the rotor 4. Further, the cover member 25 can be formed of heavy material, i.e., a material having a specific gravity higher then the specific gravity of the materials used to form the other components of the reel, so that this member can act also as the first balancer. Moreover, it is conceivable to render the balancers adjustable in their positions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spinning reel comprising:
   (a) a reel body;
   (b) a spool mounted on said reel body;
   (c) a rotor attached to said reel body, said rotor having an axis of rotation and having a plurality of components each having a mass, said plurality of components comprising
      (i) a base end portion, and
      (ii) first and second arm portions;
   (d) a handle for rotating said rotor, said handle being attached to said reel body; and
   (e) balancer means comprising first and second weights each having a mass, said balancer means being affixed to said rotor,
   wherein said balancer means has a mass that is selected such that said rotor in combination with said balancer means has a rotational imbalance less than 60 g-mm.

2. A spinning reel comprising:
   (a) a reel body;
   (b) a spool mounted on said reel body;
   (c) a rotor attached to said reel body, said rotor having an axis of rotation and having a plurality of components each having a mass, said plurality of components comprising
      (i) a base end portion, and
      (ii) first and second arm portions;
   (d) a handle for rotating said rotor, said handle being attached to said reel body; and
   (e) balancer means comprising first and second weights each having a mass, said balancer means being affixed to said rotor,
   wherein said components of said rotor have a mass selected such that said rotor in combination with said balancer means has a rotational imbalance less than 60 g-mm.

3. The spinning reel of claims 1 or 2 wherein said rotor (c) further comprises
   (iii) an arm cam pivotally affixed to said first arm portion,
   (iv) a pivotable arm pivotally affixed to said second arm portion, and
   (v) a bail connected to and extending between said arm cam and said pivotable arm.

4. The spinning reel of claims 1 or 2 which further comprises a leg portion adapted for attachment to a fishing rod, wherein a torque about an axis transverse to the axis of rotation which varies from about 0 to about 0.1 kg-cm is produced by rotation of said rotor, said torque being measured at said leg portion.

5. The spinning reel of claims 1 or 2 which further comprises a leg portion adapted for attachment to a fishing rod, wherein a load in a direction transverse to the axis of rotation which varies from about −5 g to +5 g is produced by rotation of said rotor, said load being measured at said leg portion.

6. A spinning reel comprising
(a) a reel body;
(b) a spool mounted on said reel body;
(c) a rotor attached to said reel body, said rotor having an axis of rotation and a center of gravity which does not lie on said axis of rotation, said rotor comprising a base end portion, first and second arm portions affixed to said base end portion, and a rotary flat face;
(d) a handle for rotating said rotor, said handle being attached to said reel body;
(e) first balancer means affixed to said rotor, said first balancer means having a center of gravity, said rotor and said first balancer means having a composite center of gravity between the center of gravity of said rotor and the center of gravity of said first balancer means, said composite center of gravity defining a rotational path about said axis of rotation; and
(f) second balancer means affixed to said rotor, said second balancer means having a center of gravity on said rotational path opposite said composite center of gravity with respect to said axis of rotation,
said rotor in combination with said first and second balancer means having a rotational imbalance less than 60 g-mm.

7. A spinning reel comprising:
(a) a reel body;
(b) a spool mounted on said reel body;
(c) a rotor attached to said reel body, said rotor comprising
   (i) a base end portion,
   (ii) first and second arm portions,
   (iii) an arm cam pivotally affixed to said first arm portion,
   (iv) a pivotable arm pivotally affixed to said second arm portion,
   (v) a cover member affixed to at least one of said first and second arm portions, and
   (vi) a bail, and
(d) a handle for rotating said rotor, said handle being attached to said reel body,
wherein at least two of said components (i)–(vi) of said rotor are made from a material having a first specific gravity and the remainder of said rotor is formed from materials having specific gravities different from said first specific gravity, such that said rotor has a rotational imbalance less than 60 g-mm.

8. A spinning reel comprising
(a) a reel body;
(b) a spool mounted on said reel body;
(c) a rotor attached to said reel body, said rotor having an axis of rotation and first and second halves defined by said axis of rotation,
(d) first balancer means affixed to said first half of said rotor, said first half and said first balancer means having a first composite center of gravity which defines a first rotational path about said axis of rotation,
(e) second balancer means affixed to said second half of said rotor, said second half and said second balancer means having a second composite center of gravity which defines a second rotational path about said axis of rotation, and
(f) a handle for rotating said rotor, said handle being attached to said reel body,
wherein said first and second rotational paths are substantially coincident.

9. The spinning reel of claim 8 having a rotational imbalance less than 60 g-mm.

10. The spinning reel of claim 8 having a center of gravity deviation less than 1 mm.

11. A spinning reel comprising:
(a) a reel body;
(b) a spool mounted on said reel body;
(c) a rotor attached to said reel body, said rotor comprising
   (i) a base end portion, and
   (ii) opposed arm portions;
(d) at least two weights affixed to said rotor; and
(e) a handle for rotating said rotor, said handle being attached to said reel body,
wherein said rotor in combination with said at least one weight has a rotational imbalance less than 60 g-mm.

12. A rotor for a spinning reel, said rotor having an axis of rotation and having a plurality of components each having a mass, said plurality of components comprising
   (i) a base end portion, and
   (ii) first and second arm portions,
wherein balancer means comprising at least two weights each having a mass is affixed to said rotor, and wherein said balancer means has a mass that is selected such that said rotor in combination with said balancer means has a rotational imbalance less than 60 g-mm.

13. A rotor for a spinning reel, said rotor having an axis of rotation and having a plurality of components each having a mass, said plurality of components comprising
   (i) a base end portion, and
   (ii) first and second arm portions
wherein balancer means comprising at least two weights each having a mass is affixed to said rotor, and wherein said components of said rotor have a mass selected such that said rotor in combination with said balancer means has a rotational imbalance less than 60 g-mm.

14. The rotor of claims 12 or 13 which further comprises
   (iii) an arm cam pivotally affixed to said first arm portion,
   (iv) a pivotable arm pivotally affixed to said second arm portion, and
   (v) a bail connected to and extending between said arm cam and said pivotable arm.

15. A rotor for a spinning reel, said rotor having an axis of rotation and a center of gravity which does not lie on said axis of rotation, said rotor comprising a base end portion, first and second arm portions affixed to said base end portion, and a rotary flat face,
wherein first and second balancer means are affixed to said rotor,
said first balancer means having a center of gravity, said rotor and said first balancer means having a composite center of gravity between the center of gravity of said rotor and the center of gravity of said first balancer means, said composite center of gravity defining a rotational path about said axis of rotation,
and said second balancer means having a center of gravity on said rotational path opposite said composite center of gravity with respect to said axis of rotation,
said rotor in combination with said first and second balancer means having a rotational imbalance less than 60 g-mm.

16. A rotor for a spinning reel, said rotor comprising
   (i) a base end portion,
   (ii) first and second arm portions,
   (iii) an arm cam pivotally affixed to said first arm portion, (iv) a pivotable arm pivotally affixed to said second arm portion, (v) a cover member affixed to at least one of said first and second arm portions, and (vi) a bail connected to and extending between said arm cam and said pivotable arm, wherein at least two of said components (i)–(vi) of said rotor are made from a material having a first specific gravity and the remainder of said rotor is formed from materials having specific gravities different from said first specific gravity, such that said rotor has a rotational imbalance less than 60 g-mm.

17. A rotor for a spinning reel, said rotor having an axis of rotation and first and second halves defined by a diametrical line passing through said axis of rotation, wherein first and second balancer means are affixed to said rotor, said first balancer means being affixed to said first half of said rotor, said first half and said first balancer means having a first composite center of gravity which defines a first rotational path about said axis of rotation, said second balancer means being affixed to said second half of said rotor, said second half and said second balancer means having a second composite center of gravity which defines a second rotational path about said axis of rotation, and wherein said first and second rotational paths are substantially coincident.

18. The rotor of claim 17 having a rotational imbalance less than 60 g-mm.

19. The rotor of claim 17 having a center of gravity deviation less than 1 mm.

20. A rotor for a spinning reel, said rotor comprising (i) a base end portion, and (ii) opposed arm portions, wherein at least two weights are affixed to said rotor, and wherein said rotor in combination with said at least one weight has a rotational imbalance less than 60 g-mm.

* * * * *